Patented Jan. 9, 1934

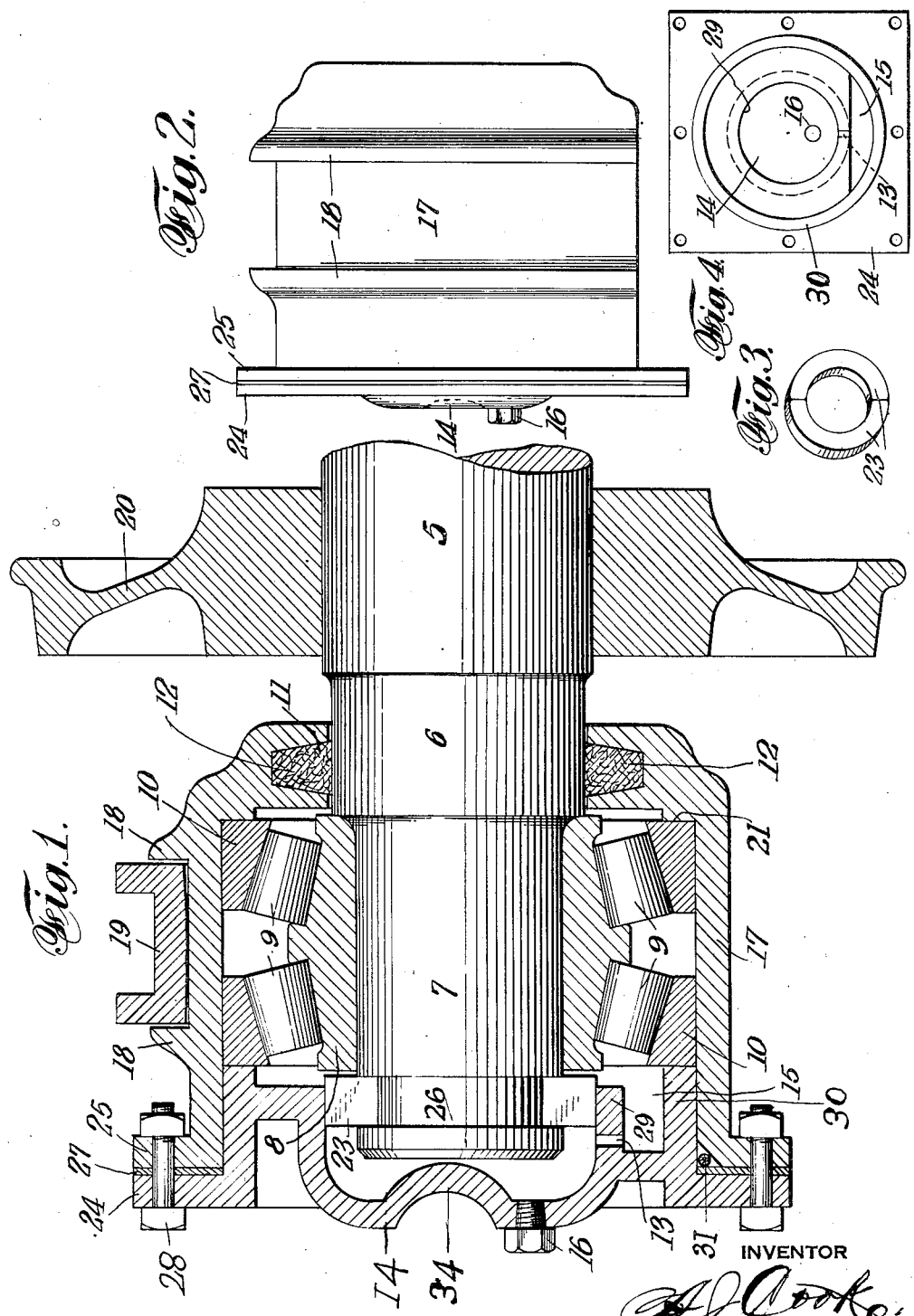

1,942,954

UNITED STATES PATENT OFFICE 1,942,954

CAR TRUCK JOURNAL BOX

Adoniram J. Cook, Westerlo, N. Y.

Application August 22, 1932. Serial No. 629,830

2 Claims. (Cl. 308—180)

The invention relates to journal boxes or housings for roller bearings such as are used in connection with car trucks and are held by the car truck frame, the object being the provision of such a box or housing which shall be locked in proper position relatively to the axle so it cannot normally become displaced; which shall take the end thrust of the axle when there is an unusual movement of the axle relatively to the box or of the box relatively to the axle; and wherein effective provision is provided for oiling the bearings, and also for excluding dust and dirt from the interior of the box or housing.

The invention consists of certain novelties of construction and in the combination of parts as herein set forth and pointed out in the claims.

The accompanying drawing illustrates an example or the embodiment of the invention, the parts being constructed and combined according to the best mode of procedure I have so far devised for the purpose.

Figure 1 is a vertical section of a car truck journal box or housing and a car wheel, the axle being in side elevation, showing my invention.

Figure 2 is an exterior side elevation view of the box, showing the end cover in position.

Figure 3 is a view in perspective of the two-part locking ring.

Figure 4 is a view in elevation of the inner surface of the box end cover.

Referring to the figures of the drawing: 5 is the axle; 20, a wheel secured to the axle; 6, the bearing surface for a dust excluding packing; 7, the projecting end of the axle to which is removably secured a sleeve 8 having two circular inclined bearing surfaces for beveled rollers 9; and 26 is a circular groove adjacent the end of the axle to receive a two-piece locking ring 23, which ring projects outside the groove and prevents excessive movement of the axle relatively to the sleeve 8, and also locks the box to the axle.

The hollow box or housing is preferably cast integral with an opening at the front end and with a back wall provided with a circular opening for the passage of the projecting end of the axle when the box is applied to the axle.

The interior space is cylindrical in outline and within which space are two rings 10, 10, each with a circular beveled surface which frictionally engages the beveled surfaces of the rollers. At the interior back wall of the box is a projecting seat 21 for the inner ring, as shown. Exteriorly the box has a seat at the top for a truck frame member 19 formed by the ribs 18, 18, and the vertical sides of the box have seats 17 formed by the ribs 18, 18 to receive jaws or other members of the truck frame. The open end of the box is provided with a projecting perforated flange 25. The end cover 14 has a projecting perforated flange 24 matching flange 25 and a plurality of threaded bolts 28 and nuts, the bolts being passed through the perforations in both flanges and the nuts applied to the bolts, which bolts and nuts detachably hold the cover in place. A shim or shims or packing 27 may be disposed between the flanges, as shown. The cover 14 is specially designed for several purposes, to wit: to serve as a bearing for the outer beveled ring 10, to engage the two-piece locking ring 23 and hold the box in proper position relatively to the axle, and to take excessive end thrusts of the axle. For the first purpose the cover has a circular flange 30 engaging the ring 10; for the second purpose it has a circular bearing surface 29 which laps over the exterior surface of the double ring 23 and holds the ring in locking position and at the same time permits a limited end movement of the box relatively to the axle; and for the third purpose a preferably semispherical inwardly extending projection 34 is provided with a surface adapted to engage the end of the axle and take the thrust when there is an excessive movement of the box or housing relatively to the axle, or vice versa.

To supply the interior of the box with oil the cover is provided with a threaded hole and a plug 16, and oil will pass by way of the hole 13 to the receptacle 15 in the cover at the side of which it is delivered to the bearings.

A packing 31 may be present to prevent any possible leakage of the oil.

To prevent the passage of dust or dirt to the interior of the box a half V-shaped groove 11 is formed in the circular edge of the opening through the back wall of the box and a packing 12 is inserted therein which frictionally engages the exterior surface 6 of the axle, the shape of the groove facilitating the outward movement of the packing from the groove into close contact with the circular surface 6.

From the foregoing description, taken with the illustrated example of the embodiment of the invention, it will be clear that the objects of the invention specified are attained.

What I claim is:

1. The combination with a rotatory axle having a groove adjacent to its end, and a fixed journal box having a removable end cover, of a ring formed of a plurality of sections located within said groove in the axle, and said ring being overlapped at its outer edge by and held in locking position by the cover when the latter is secured to the box.

2. The combination with a rotatory axle journal and a fixed journal box having a removable cover, of detachable means interlocking with the axle journal, a part of the said cover overlapping the periphery of the said means and holding the said means against radial displacement relatively to the axle journal.

ADONIRAM J. COOK.